United States Patent [19]

Owsley et al.

[11] Patent Number: 4,819,689
[45] Date of Patent: Apr. 11, 1989

[54] HEAD-GUIDED POPPET VALVE MEMBER AND VALVE ASSEMBLY

[75] Inventors: Herbert B. Owsley; James S. Bunn, both of, Shawnee, Kans.

[73] Assignee: Ball Valve Company, Olathe, Kans.

[21] Appl. No.: 151,223

[22] Filed: Feb. 1, 1988

[51] Int. Cl.$^4$ .............................................. F16K 15/02
[52] U.S. Cl. .......................... 137/512.1; 137/543.23; 137/902
[58] Field of Search ................. 137/512.1, 543.23, 902

[56] References Cited

U.S. PATENT DOCUMENTS

| | | | |
|---|---|---|---|
| 1,834,596 | 12/1928 | Clapp | 251/63.4 X |
| 2,011,547 | 8/1935 | Campbell | 137/902 X |
| 2,538,364 | 1/1951 | James et al. | 137/540 X |
| 3,148,697 | 9/1964 | Carr | 137/512.1 X |
| 3,417,778 | 12/1968 | Ratelband | 137/543.23 X |
| 3,565,100 | 2/1971 | Pfleger | 137/543.23 X |
| 3,701,361 | 10/1972 | Bunn et al. | 137/543.23 |
| 4,228,820 | 10/1980 | Deminski | 137/543.23 X |
| 4,479,508 | 10/1984 | Breed | 137/543.23 X |

FOREIGN PATENT DOCUMENTS 2546600  11/1984  France .................. 137/543.23

Primary Examiner—John Rivell
Attorney, Agent, or Firm—Litman McMahon & Brown

[57] ABSTRACT

A poppet valve assembly includes a cage with a cage fluid passage and a seat with a seat fluid passage. A poppet valve member includes a head and is movable between a closed position with the head engaging the seat and an open position with the head spaced from the seat. The valve member is stemless and is guided by a guide fin assembly including a plurality of guide fins slidably engaging the seat passage.

5 Claims, 1 Drawing Sheet

U.S. Patent    Apr. 11, 1989    4,819,689
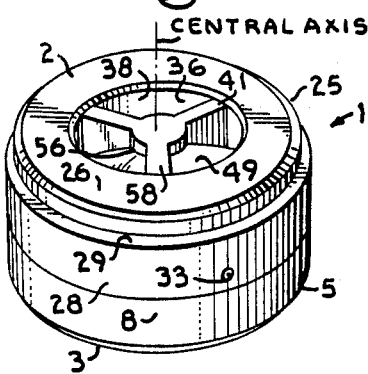
Fig.1.
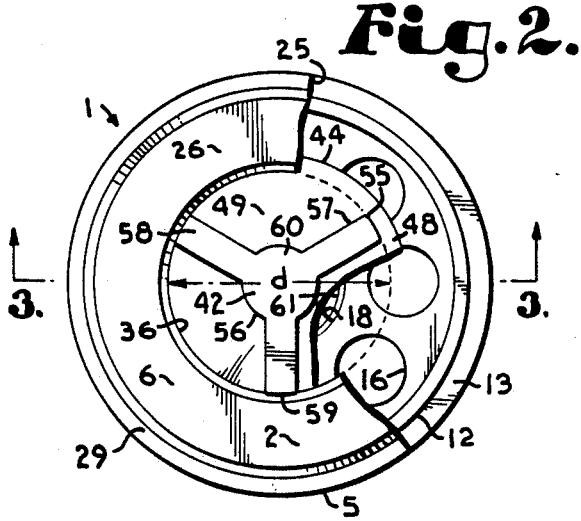
Fig.2.
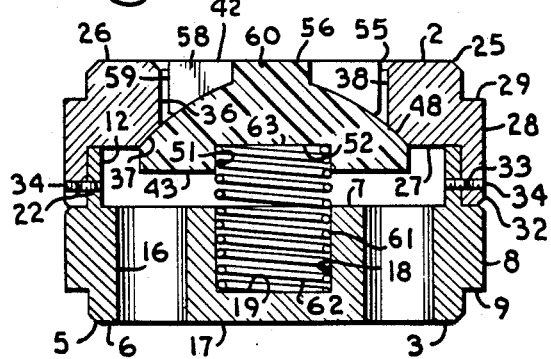
Fig.3.
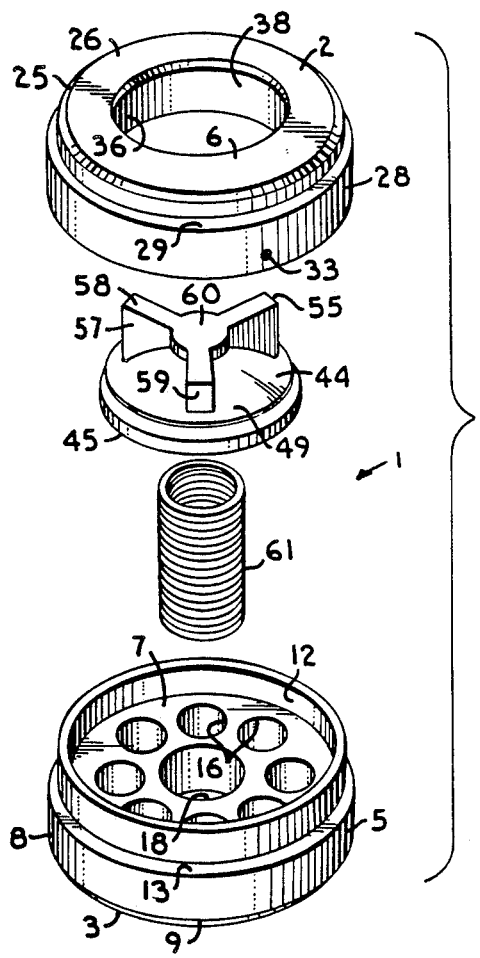
Fig.4.
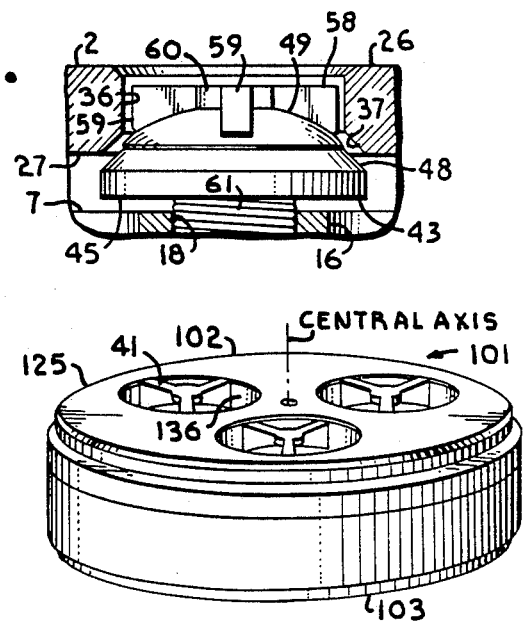
Fig.5.
Fig.6.

HEAD-GUIDED POPPET VALVE MEMBER AND VALVE ASSEMBLY

BACKGROUND OF THE INVENTION

1. Field of the Invention

The present invention relates generally to valve assemblies, and in particular to a valve assembly with a head-guided, stemless poppet valve member.

2. Description of the Prior Art

Fluid pumps and compressors commonly include suction valves for fluid intake and discharge valves for fluid exhaust. In reciprocating-type pumps and compressors the valve assemblies are automatically actuated by the changing fluid pressure differential across them. On a suction stroke the compressor or pump piston is moving away from a suction valve assembly located at one end of the compressor cylinder. As the volume of the compressor cylinder thus expands, its pressure decreases to a point where a greater fluid pressure in a suction line causes the suction valve assembly to open and refill the compressor cylinder with pressurized fluid.

On a discharge stroke the piston contracts the cylinder volume, thereby increasing the fluid pressure until the discharge valve assembly opens under the influence of a pressure differential across it. The suction and discharge valve assemblies generally permit fluid flow in one direction only and automatically close when the fluid pressure differential drops below the predetermined level necessary to hold the valve assembly open.

Many reciprocating-type pumps and compressors are of the double-acting type wherein each cylinder end has one or more suction valve assemblies and one or more discharge valve assemblies. Thus, the piston discharge stroke at one end of the compressor cylinder is the suction stroke at the other end and vice versa. For example, such double-acting reciprocating compressors are typically provided in pumping stations along natural gas pipelines which transport large quantities of natural gas. Efficient transportation of natural gas through pipelines is highly dependent upon the efficiency of the compressors, which in turn depends upon a number of factors, including the efficiency of the valve assemblies.

Automatic-lift, one-way valve assemblies include valve members that selectively engage seats to close the seat fluid passages therethrough. Valve members heretofore employed include plates, channels, reeds and poppets. Poppet valve members generally include heads with convex or frusto-conical mating surfaces for engaging corresponding valve seats. Most prior art poppet valve members also include guide stems extending from their heads in a downstream direction. For example, the Bunn et al. U.S. Pat. No. 3,701,361 discloses a poppet valve member with a guide stem extending in a downstream direction from a head and a plurality of fins extending in an upstream direction from the head. The fins are slidably received in a port extending through a valve seat. Both the guide stem and the fins guide the valve member in reciprocation between its open and closed positions.

However, a disadvantage with this and many other prior art poppet valve assemblies is that they require cages with relatively high profiles to receive the valve member stems. Such higher profiles and greater overall valve assembly depth can contribute to lower compressor efficiencies because they tend to add clearance volume at the compressor ends. Accordingly, it is desirable to provide valve assemblies with profiles that are as low as possible so that minimal clearance is added to the compressor ends. The present invention addresses this problem. Heretofore, there has not been available a valve assembly or valve member with the advantages and features of the present invention.

SUMMARY OF THE INVENTION

In the practice of the present invention, a valve assembly is provided with a cage including inner and outer faces and a plurality of cage fluid passages extending therebetween. The cage includes a spring bore open at its inner face. A seat with inner and outer faces is mounted on the cage with the inner faces in opposed relation. The seat includes a seat fluid passage with a seat mating portion adjacent the seat inner face and a guide portion adjacent the seat outer face. A poppet valve member includes a head with a base, a beveled mating portion and a center portion. A valve member spring bore is provided in the valve member head base. A guide fin assembly is intergrally secured to the valve member head and includes a plurality of radially-extending guide fins slidably received in the seat fluid passage. The guide fins guide the valve member as it reciprocates between a closed position with the valve member mating portion engaging the seat mating portion whereby the seat fluid passage is substantially occluded and an open position with the valve member mating portion in spaced relation from the seat mating portion. The valve member is positioned completely upstream from the cage inner face. A return spring is partly received in the cage spring bore and the valve member spring bore and biases the valve member toward its closed position.

In an alternative embodiment of the present invention, a plurality of poppet valve members are movably mounted between a cage and a seat for selectively closing respective seat passages.

OBJECTS OF THE INVENTION

The principal objects of the present invention are: to provide a poppet valve assembly; to provide such a valve assembly which includes a poppet valve member; to provide such a valve assembly wherein the valve member includes a guide fin assembly; to provide such a valve assembly wherein the guide fin assembly guides the valve member between its open and closed positions; to provide such a valve assembly with a seat having an inner face; to provide such a valve assembly wherein the valve member is completely in spaced relation from the seat inner face; to provide such a valve assembly which is adapted for multiple valve members; to provide a poppet valve member without a valve stem; to provide such a poppet valve member which is guided substantially by a guide fin assembly slidably received in a seat fluid passage; and to provide such a valve assembly and valve member which are efficient in operation, capable of a long operating life, economical to manufacture and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a valve assembly embodying the present invention.

FIG. 2 is an enlarged, top plan view of the valve assembly with portions broken away to reveal internal construction.

FIG. 3 is a vertical, cross-sectional view of the valve assembly taken generally along line 3—3 in FIG. 2.

FIG. 4 is a perspective, exploded view of the valve assembly showing the parts thereof disassembled.

FIG. 5 is a fragmentary, vertical cross-sectional view of the valve assembly, particularly showing a valve member in its open position.

FIG. 6 is a perspective view of a valve assembly comprising a modified embodiment of the present invention.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a poppet valve assembly embodying the present invention and suitable for use as either a suction/inlet valve assembly or a discharge/outlet valve assembly. A central axis extends through the valve assembly 1 and the term "coaxial" relates to this axis. The direction of fluid flow is downward through the poppet valve assembly 1 as shown in FIG. 1 from an inlet side 2 to an outlet side 3. With the poppet valve assembly used as a suction valve assembly, its inlet side 2 would communicate with a gas suction line and its outlet side 3 would communicate with a compressor cylinder. In a discharge valve configuration, the inlet side 2 would communicate with the compressor cylinder and the outlet side 3 would communicate with a gas discharge line.

A cage 5 includes an outer face 6 at the valve assembly outlet side 3 and an inner face 7. The cage 5 includes an annular, coaxial, peripheral surface 8 and an annular, coaxial, outer shoulder 9 recessed from the peripheral surface 8.

An annular flange 12 projects in an upstream direction from the cage inner face 7 in spaced relation inwardly from the peripheral surface 8 whereby an annular, coaxial, inner cage shoulder 13 is formed.

A plurality of cage fluid passages 16 extend between the cage faces 6, 7 and are arranged in a coaxial, spaced circular pattern positioned inwardly from the outer cage shoulder 9 and the flange 12. The cage fluid passages 16 encircle and define a coaxial spring boss 17 with a coaxial spring bore 18 open at the inner face 7 and terminating at a blind end 19 in spaced relation from the cage outer face 6. A pair of cage mounting pin receivers 22 extend transversely through the flange 12 at diametrically opposed locations.

A seat 25 includes an outer face 26 at the valve assembly inlet side 2 and an inner face 7 in opposed, spaced relation to the cage inner face 7. A coaxial seat peripheral surface 28 is aligned with the cage peripheral surface 8 and a coaxial, outer seat shoulder 29 is recessed from the seat peripheral surface 28 adjacent to the seat inner face 27. The seat 25 includes an inwardly-extending, coaxial seat flange 32 aligned with the seat peripheral surface 28 and adapted to telescopically receive the cage flange 12 when the cage 5 and the seat 25 are assembled. A pair of seat mounting pin receivers 33 extend through the seat flange 32 at diametrically spaced locations and are aligned with respective cage mounting pin receivers 22 when the cage 5 and the seat 25 are assembled. A pair of mounting pins 34 are received in respective mounting pin receivers 22, 33 and secure the cage 5 and the seat 25 together (FIG. 3).

A coaxial seat passage 36 extends between the seat faces 26, 27 and includes an inwardly divergent, beveled, frusto-conical seat mating portion 37 at the seat inner face 27 and a cylindrical guide portion 38 extending from the seat mating portion 37 to the seat outer face 26.

A coaxial poppet valve member 41 includes upsteam and downstream ends 42, 43 and a head 44 with a circular base 45 at the valve member downstream end 43. The head 44 includes a beveled, frusto-conical valve member mating portion 48 converging in an upstream direction from the head base 45 and adapted to selectively mate with the seat mating portion 37. The head 44 also includes a convex center portion 49 extending in an upstream direction from the valve member mating portion 48. A coaxial valve member spring bore 51 is open at the head base 45 and terminates at a blind end 52.

A guide fin assembly 55 is provided on the head center portion 49 and projects generally upstream therefrom. The guide fin assembly 55 includes a central, cylindrical, coaxial guide fin boss 56 and a plurality (for example, three are shown) of guide fins 57 extending radially outwardly therefrom across the head center portion at 120° radial intervals. Each guide fin 57 includes an upstream edge 58 at the valve member upstream end 42 and a respective bearing edge 59 extending from the valve member upstream end 42 to a position spaced slightly outwardly from the valve member mating portion 48.

A helical return spring 61 includes a downstream end 62 positioned within the cage spring bore 18 and an upstream end 63 positioned within the valve member spring bore 51.

In operation, the return spring 61 biases the valve member 41 towards a closed position as shown in FIG. 3 with the seat and valve member mating portions 37, 48 engaged whereby the seat passage 36 is substantially occluded. When the fluid pressure on the valve assembly inlet side 2 exceeds the fluid pressure on the valve assembly outlet side 3 by an amount sufficient to overcome the force of the return spring 61, the valve member 41 is moved by the fluid pressure differential to an open position as shown in FIG. 4 whereby fluid is permitted to flow through the seat passage 36 around the valve member head 44 and through the cage fluid passages 16. When the fluid pressure differential decreases, the return spring 61 returns the valve member 41 to its closed position and the cycle repeats.

The guide fin bearing edges 59 define a diameter d of the guide fin assembly 55 only slightly less than a diameter of the seat passage 36. The fit tolerance between the guide fin bearing edges 59 and the seat passage 36 is preferably just sufficient to allow freely-sliding contact therebetween without substantial friction. The guide fin bearing edges 59 maintain the valve member 41 in proper coaxial alignment as it reciprocates between its open and closed positions. Proper alignment is aided somewhat by the return spring 61, but alignment is preferably accomplished primarily by means of the guide fins 57. In particular, the guide fins 57 cooperate with the seat passage 36 to prevent the valve member 41 from tilting off-axis which could result in leakage, efficiency loss and even damage to the valve assembly 1.

The guide fin assembly 55 provides very little resistance to fluid flow through the seat passage 36, whereby efficiency losses through the valve assembly 1 are relatively low. The poppet valve assembly 1 has improved operating characteristics over many prior art poppet valve assemblies because it tends to be more compact and adds less clearance to a compressor cylinder. The compactness of the poppet valve assembly 1 of the present invention is achieved by eliminating the poppet valve member stems which extend from the heads of many prior art poppet valve members for guidance, and instead employs the guide fin assembly 55 for guidance. The guide fin assembly 55 tends to add less overall length to the poppet valve member 41 than was customarily required for the valve stems of many prior art poppet valve members. Thus, the overall length (i.e. the distance between the inlet and outlet sides 2, 3) of the poppet valve assembly 1 is less than that of many prior art poppet valve assemblies and the compressor cylinder clearance associated with the valve assembly 1, which includes the fluid passages 16 when the valve assembly 1 is used as a suction valve, is less because these passages can be somewhat shorter.

FIG. 6 shows a poppet valve assembly 101 comprising a modified embodiment of the present invention. The poppet valve assembly 101 includes a seat 125 with three seat passages 136 extending therethrough and slidably receiving the guide fin assemblies 55 of three poppet valve members 41. The seat passages 136 are positioned in a circular pattern at 120° intervals with respect to the central axis of the poppet valve assembly 101. The poppet valve assembly 101 operates in a manner similar to the poppet valve assembly 1 and also includes a shorter length from an inlet side 102 to an outlet side 103 compared to prior art poppet valve assemblies with conventional poppet valve members having valve stems. The poppet valve assembly 101 thus achieves the advantages discussed above in connection with the poppet valve assembly 1.

It is to be understood that while certain forms of the present invention have been illustrated and described herein, it is not to be limited to the specific forms or arrangement of parts described and shown.

What is claimed and desired to be secured by Letters Patent is as follows:

1. A poppet valve assembly, which comprises:
   (a) an inlet side;
   (b) an outlet side;
   (c) a cage including:
      (1) an outer face at said valve assembly outlet side;
      (2) an inner face;
      (3) a peripheral surface;
      (4) a spring boss having a cage spring bore open at said cage inner face and terminating at a blind end; and
      (5) a plurality of cage fluid passages encircling said spring boss and each extending between said cage outer and inner faces;
   (d) a seat including:
      (1) an outer face at said valve assembly inlet side;
      (2) an inner face positioned in opposed relation to said cage inner face; and
      (3) a seat fluid passage including a seat mating portion adjacent said seat inner face and a guide portion adjacent said seat outer face;
   (e) a poppet valve member including:
   (1) an upstream end;
      (2) a downstream end;
      (3) a head with a substantially flat base at said valve member downstream end, a valve member mating portion with a beveled, frusto-conical configuration projecting inwardly and in an upstream direction from said base, and a convex center portion extending inwardly and in an upstream direction from said mating portion;
      (4) a spring bore open at said valve member base and terminating at a blind end;
      (5) a guide fin assembly including a coaxial guide fin boss with an upstream end projecting in an upstream direction from said head center portion and a plurality of guide fins extending radially outwardly from said guide fin boss, each said guide fin including an upstream edge at said valve member upstream end and a bearing edge extending in parallel, spaced relation to said guide fin boss, said guide fin upstream edges being substantially flush with said guide fin boss upstream end at said valve member upstream end; and
      (6) said valve member being mounted between said cage and said seat and adapted for movement between a closed position with said valve member mating portion engaging said seat mating portion and an open position with said mating portions in spaced relation, said valve member being guided between its open and closed positions by said guide fin bearing edges slidably engaging said seat passage, said valve member being completely spaced upstream from said cage inner face; and
   (f) a return spring including a downstream end received in said cage spring bore and an upstream end received in said seat spring bore, said return spring biasing said valve member towards its closed position.

2. The valve assembly according to claim 1, which includes:
   (a) said guide fin bearing edges being positioned in spaced relation along a circle having a diameter slightly less than a diameter of said seat fluid passage.

3. The valve assembly according to claim 2 wherein:
   (a) said guide fins are radially spaced at approximately 120° intervals.

4. The valve assembly according to claim 1, which includes:
   (a) said cage having a plurality of said spring bores;
   (b) said seat having a plurality of said seat passages;
   (c) a plurality of said valve members each movable between open and closed positions with respect to a respective seat passage; and (d) a plurality of said return springs each engaging said cage and a respective valve member for biasing said valve member to its closed position.

5. The valve assembly according to claim 1, which includes:
   (a) said cage having a peripheral surface and a flange positioned inwardly from said peripheral surface and extending in an upstream direction from said cage inner face, said flange forming an inner cage shoulder adjacent said cage peripheral surface; and
   (b) said seat having a seat peripheral surface and a seat flange flush with said seat peripheral surface, said seat flange telescopically receiving said cage flange.

* * * * *